United States Patent
Emerson et al.

(10) Patent No.: US 11,807,779 B2
(45) Date of Patent: Nov. 7, 2023

(54) ADDITIVE FOR QUALITY DETERMINATION OF CONVERSION COATINGS

(71) Applicant: Hamilton Sundstrand Corporation, Charlotte, NC (US)

(72) Inventors: Sean C. Emerson, Broad Brook, CT (US); Blair A. Smith, South Windsor, CT (US); Weina Li, South Glastonbury, CT (US); Georgios S. Zafiris, Glastonbury, CT (US); Bart Antonie Van Hassel, Weatogue, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 91 days.

(21) Appl. No.: 17/370,489

(22) Filed: Jul. 8, 2021

(65) Prior Publication Data

US 2021/0332249 A1    Oct. 28, 2021

Related U.S. Application Data

(62) Division of application No. 16/152,050, filed on Oct. 4, 2018, now Pat. No. 11,084,942.

(51) Int. Cl.
| | |
|---|---|
| C09D 5/00 | (2006.01) |
| C09D 5/33 | (2006.01) |
| C09D 5/08 | (2006.01) |
| C09D 5/22 | (2006.01) |
| C09D 5/32 | (2006.01) |
| G01N 21/64 | (2006.01) |

(52) U.S. Cl.
CPC ............. *C09D 5/004* (2013.01); *C09D 5/084* (2013.01); *C09D 5/086* (2013.01); *C09D 5/22* (2013.01); *C09D 5/32* (2013.01); *G01N 21/6447* (2013.01)

(58) Field of Classification Search
CPC ........ C09D 5/004; C09D 5/084; C09D 5/086; C09D 5/22; C09D 5/32; G01N 21/6447
See application file for complete search history.

(56) References Cited

U.S. PATENT DOCUMENTS

| | | |
|---|---|---|
| 9,650,521 B1 | 5/2017 | Kato et al. |
| 10,533,254 B2 | 1/2020 | Westre et al. |
| 2016/0083848 A1 | 3/2016 | Chernyshov |
| 2018/0105702 A1 | 4/2018 | Mardel et al. |
| 2018/0216234 A1 | 8/2018 | Westre et al. |
| 2020/0141005 A1 | 5/2020 | Westre et al. |

FOREIGN PATENT DOCUMENTS

| | | |
|---|---|---|
| KR | 20150061404 A | 6/2015 |
| WO | WO2017116547 A1 | 7/2017 |
| WO | WO2018032006 A1 | 2/2018 |

OTHER PUBLICATIONS

Extended European Search Report for EP Application No. 19201089.0, dated Feb. 27, 2020, pp. 7.

*Primary Examiner* — Edward J Cain
(74) *Attorney, Agent, or Firm* — Kinney & Lange, P. A.

(57) ABSTRACT

A method of applying a trivalent chromium or chromium-free conversion coating to a metallic substrate including mixing a dye compound that interacts with electromagnetic radiation outside the human visual spectrum but not electromagnetic radiation that is within the human visual spectrum to produce an observable emission into the trivalent chromium or chromium-free conversion coating mixture to allow for inspection of the coating after applied with a correlating electromagnetic radiation source.

13 Claims, 2 Drawing Sheets

ADDITIVE FOR QUALITY DETERMINATION OF CONVERSION COATINGS

CROSS-REFERENCE TO RELATED APPLICATION(S)

This application is a divisional of U.S. application Ser. No. 16/152,050 filed Oct. 4, 2018 for "ADDITIVE FOR QUALITY DETERMINATION OF CONVERSION COATINGS" by S. C. Emerson, B. A. Smith, W. Li, G. S. Zafiris and B. A. Van Hassel.

BACKGROUND

This application relates generally to anti-corrosion coatings, and specifically to trivalent chromium conversion coatings.

Conversion coatings are used to protect metal components from corrosion by converting the surface of the component through a chemical process. Prior art uses hexavalent chromium conversion coatings to passivate metallic substrates. However, hexavalent chromium is being phased out of most industry processes. Trivalent chromium or chromium-free conversion coatings have replaced hexavalent chromium conversion coatings in most applications.

Trivalent chromium or chromium-free conversion coatings on metallic components are essentially colorless, meaning they are typically not visible when exposed to electromagnetic radiation in any useful wavelength, including electromagnetic radiation within the human visual spectrum (about 390 nanometers to about 700 nanometers). In contrast, hexavalent chromium conversion coatings are yellow in color and easy for humans to visually inspect for flaws in the coating. With colorless trivalent chromium or chromium-free conversion coatings, visual inspection of the coating integrity is not feasible without additional additives.

SUMMARY

In a first embodiment, a component includes a substrate and a conversion coating thereon. The conversion coating includes a conversion compound and a dye compound, wherein the dye compound interacts with electromagnetic radiation outside the human visual spectrum to produce an observable emission.

In a second embodiment, a conversion coating solution includes a corrosion inhibiting component and a dye compound that interacts with electromagnetic radiation but not electromagnetic radiation that is within the human visual spectrum to produce an observable emission.

In a third embodiment, a method includes applying electromagnetic radiation to a conversion coating comprising a non-hexavalent chromium corrosion inhibiting compound and a dye compound that interacts with electromagnetic radiation to produce an observable emission, and inspecting the integrity of the conversion coating with by observing emissions from the dye compound in response to the electromagnetic radiation.

DETAILED DESCRIPTION

Colorless conversion coatings, such as trivalent chromium or chromium-free conversion coatings, can be inspected for flaws if a dye compound that is observable when exposed to electromagnetic radiation outside the human visual spectrum (but not electromagnetic radiation that is within the human visual spectrum) is added to the conversion coating during the coating process. Depending on the exact dye, material, or chemical additive utilized, inspection can be performed visually or by means of instrumentation, if the additive is only observable at an electromagnetic radiation range outside of the visible spectrum. The human visible spectrum includes electromagnetic radiation having a wavelength between about 390 nanometers to about 700 nanometers. Therefore, electromagnetic radiation outside the human visible spectrum includes radiation with a wavelength less than about 390 nanometers, for example ultraviolet, x-ray, or gamma ray radiation, or with a wavelength greater than about 700 nanometers, for example infrared or microwave radiation.

For instance, if a dye compound that is observable in the infrared or ultraviolet range is added to a colorless conversion coating, the integrity of the colorless conversion coating can be inspected easily if the appropriate wavelength of electromagnetic radiation is applied and the coating is inspected via the appropriate instrumentation. In some embodiments, thus allows for observation by naked eye. This allows for characterization of flaws (lack of coverage) in coatings using readily available inspection techniques. In addition, the use of a dye compound that is observable when exposed to electromagnetic radiation outside the human visual spectrum (but not electromagnetic radiation that is within the human visual spectrum) does not alter the human perception that the conversion coating is "colorless."

Figure 1:
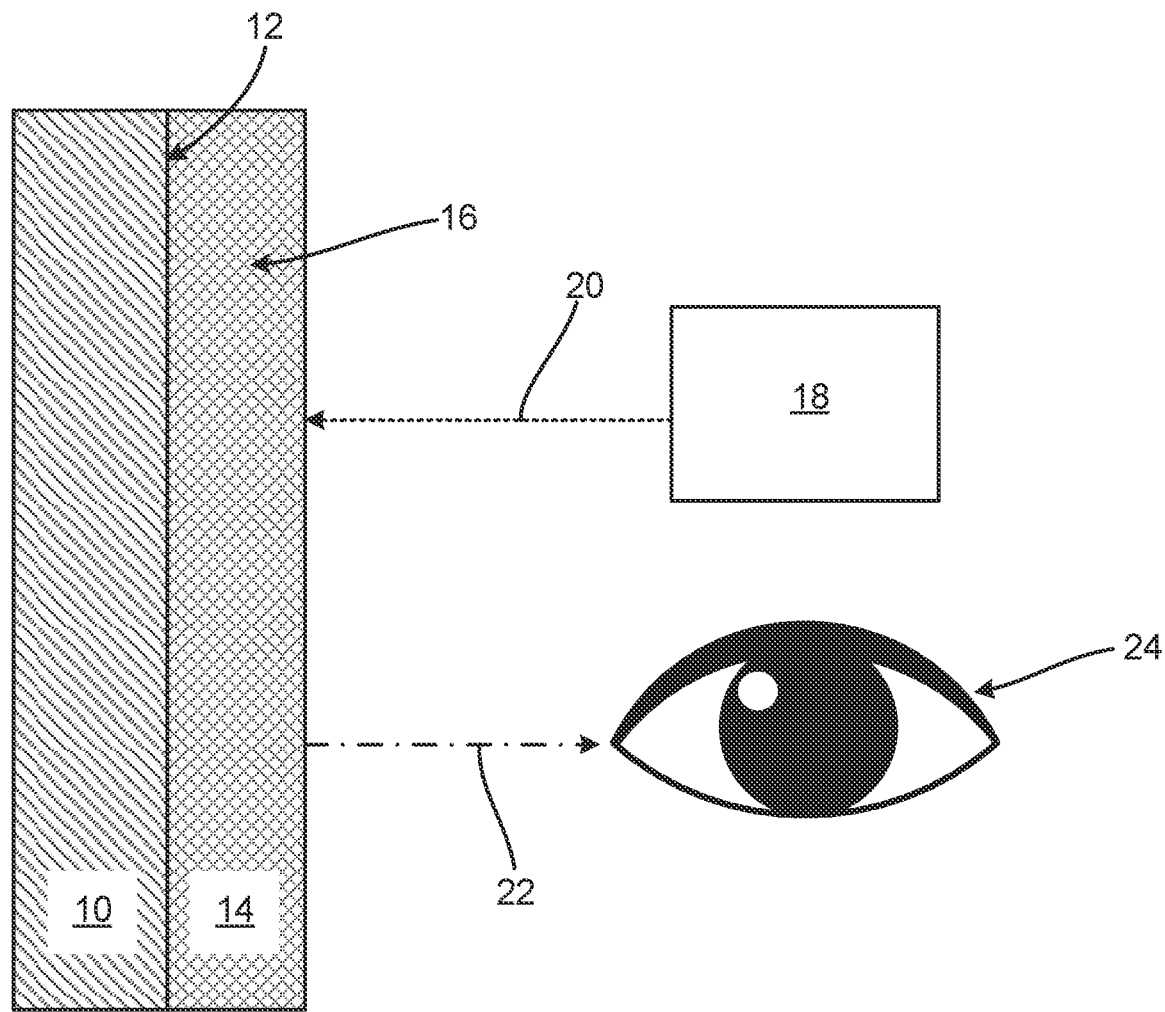
FIG. 1 is a schematic drawing of a conversion coating on a substrate in which the conversion coating contains a dye compound that is observable when exposed to electromagnetic radiation outside the human visual spectrum on a substrate.

FIG. 1 is a schematic drawing of substrate 10 having a surface 12 onto which conversion coating 14 is deposited. Conversion coating 14 contains dye compound 16 that is observable when exposed to electromagnetic radiation outside the human visual spectrum (but not electromagnetic radiation that is within the human visual spectrum). This non-visible radiation is in the range of about 390 nanometers to about 700 nanometers). Radiation source 18 generates radiation 20 that is of a wavelength outside the human visual spectrum and directs radiation 20 towards conversion coating 14. Dye compound 16 in conversion coating 14 generates emission 22 as a result of interacting with radiation 20. As further discussed below, emission 22 may be a fluorescence, phosphorescence, reflection or scattering of the non-absorbed radiation wavelengths depending on the particular dye compound 16 in conversion coating 14 and the type of radiation 20 directed towards conversion coating 14. Emission detector 24 receives emission 22 and permits inspection of the integrity of conversion coating 14.

Substrate 10 can be any material that would benefit from being coated with a conversion coating 14. For example, substrate 10 can be steel, aluminum, zinc, cadmium, copper, silver, magnesium, tin, or alloys thereof. Substrate surface 12 can be the surface of an aircraft component needing corrosion protection, such as, for example, gears, rotor blades, propellers, landing gear and wheels, panels, fan blades, fuel controls, heat exchangers, propeller spinners, propeller barrels or hubs, electronic boxes, nacelles, fasteners, or other components subject to corrosion through friction or environmental stresses.

Conversion coating 14 is a trivalent chromium-based or chromium-free conversion coating. Conversion coatings are coatings for metallic substrates 10 where surface 12 of substrate 10 reacts with the conversion coating 14 through a chemical process. Trivalent chromium-based or chromium-free conversion coatings 14 in particular are used to passivate metallic substrates 10, and can be used for corrosion inhibition, priming, decorative finishes, or for retention of electrical conductivity. For trivalent chromium-based conversion coatings, complex chromium (III), chromium sulfate, chromium hydroxide sulfate, chromium trifluoride solutions, dipotassium hexafluorozirconate, zinc sulfate heptahydrate, sodium sulphate, potassium tetrafloroborate, lanthanum nitrate hexahydrate, and combinations thereof can be used.

Importantly, surface 12 of substrate 10 is chemically altered by the application of conversion coating 14. The chemical conversion process is known by a person skilled in the art. Conversion coating 14 that contains dye compound 16 interacts with substrate 10 molecules to provide corrosion protection. However, dye compound 16 does not alter surface 12 of substrate 10, nor does dye compound 16 interact with conversion coating 14. Thus, dye compound 16 does not alter the corrosion protection properties conversion coating 14 imparts to surface 12.

Typically, the conversion coating 14 is no more than 500 nanometers. Conversion coating 10 is a trivalent chromium (or chromium-free) conversion coating. In one embodiment, the trivalent chromium component of conversion coating 16 can be, for example, a trivalent chromium salt. In a chromium-free conversion coating variant, other chemical components may be present depending on the type of conversion coating used.

Examples of commercially available trivalent chromium-containing coatings include, Henkel® TCC coatings (BONDERITE M-CR T5900 RTU AERO, BONDERITE M-CR 871 AERO), Socomore® TCC coatings (Sococurf TCS/PACS), Chemeon® TCC coatings (Chemeon® TCP NP, Chemeon® TCP HF), and SurTec® TCC coatings (SurTec® 650V, 650, or 650C). Commercially available chromium-free conversion coating include BONDERITE M-NT 5200 AERO (also known as Alodine 5200) and BONDERITE M-NT 5700 AERO (also known as Alodine 5700) both by Henkel.

Dye compound 16 is a dye mixed in with conversion coating 14. Dye compound 16 allows for inspection of conversion coating 14 following irradiation with electromagnetic radiation 20 of an appropriate wavelength. Dye compound 16 interacts with electromagnetic radiation outside the human visual spectrum, such as ultra violet light or infrared light, but is otherwise compatible with conversion coating 14, meaning dye compound 16 does not alter the chemical composition or inherent properties of conversion coating 14 or substrate 10. In some embodiments, dye compound 16 reflects or scatters the non-absorbed wavelengths of electromagnetic radiation 20. In other embodiments, dye compound 16 phosphoresces or fluoresces when it is exposed to electromagnetic radiation 20. Alternatively, dye compound 16 can be a different material or chemical additive that is not a traditional "dye," but nonetheless allows for inspection of conversion coating 14 following irradiation with electromagnetic radiation 20 of an appropriate wavelength.

In one embodiment, the dye compound 16 emits in the visible range of the spectrum upon exposure to ultra-violet or higher frequency electromagnetic radiation, via either a fluorescence or a phosphorescence mechanism, thus enabling the visual inspection of the integrity of the conversion coating. In a second embodiment, dye compound 16 emits in a non-visible range of the spectrum upon exposure to a higher frequency electromagnetic radiation, again via either a fluorescence or a phosphorescence mechanism. In this case, appropriate instrumentation that allows for the visualization of the emitted radiation is utilized to inspect the integrity of the conversion coating.

Dye compound 16 can be but is not limited to, for example, strontium containing compounds, manganese containing compounds, rare earth metal containing compounds, organic compounds, or other fluorescent or phosphorescent material that interacts with electromagnetic radiation 20. Fluorescent materials emit back light, typically in the human visible spectrum, upon their exposure to and absorbance of shorter wavelength electromagnetic radiation, such as UV light in the range of 300 to 350 nanometers. The exact color fluorescent materials emit depends on their molecular structure. These materials can be either inorganic or organic molecules.

Appropriate organic fluorescent materials include polycyclic or polyaromatic hydrocarbons containing heteroatoms such as sulfur, nitrogen, and oxygen. For example, appropriate materials that fluoresce in red include anthrathioxanthene, thioxanthene benzanthrone, and anthraquinones. Materials that fluoresce in yellow includes xanthene, benzothioxanthene-dicarboximide, aminoketones, naphtalimide, and perylene. Materials that fluoresce in blue include coumarin and hydroxycoumarin. Appropriate inorganic fluorescent materials include some divalent manganese containing salts such as manganese doped zinc silicate, which fluoresces green, or trivalent lathanide salts.

Phosphorescent materials emit back light upon being exposed to electromagnetic radiation of a shorter wavelength. Compared to fluorescent materials, phosphorescent materials light emission is of lower intensity and lasts longer, for some time beyond the original excitation. Useful phosphorescent materials include strontium aluminates, lanthanide doped (e.g., europium, dysprosium, cerium doped) or manganese doped strontium aluminates, or copper activated zinc sulfide.

Generally, dye compound 16 should be no more than 15% by weight of conversion coating 14, such as no more than 5% by weight of conversion coating 14, and may be no more than 1% by weight of conversion coating 14. Thus, dye compound 16 should not interfere with the chemistry of conversion coating 14, but should still be observable when excited by the correct wavelength of light for inspection.

Radiation source 18 is used to inspect the integrity of coating 14. Radiation source 18 should be selected such that it produces radiation 20 that interacts with dye compound 16 to produce observable emission 22. For example, if dye compound 16 absorbs electromagnetic radiation in the ultra violet range, then radiation source 18 can be a UV lamp. In other embodiments, radiation source 18 can be a black light, IR lamp, or laser, depending on dye compound 16. Radiation source 18 induces fluorescence, phosphorescence, or reflection, or scattering of non-absorbed radiation in dye compound 16 to allow observable inspection.

Emission detector 24 can be, for example, a human eye where emissions 22 are within the visible spectrum. Alternatively, if emissions 22 are outside of the visible spectrum, other types of detectors such as UV or IR detector devices can be used for detector 24. These alternative types of detectors can be used in conjunction with an automated inspection system and paired with a computer to record the inspection of coating 14.

When coating 14 is inspected with radiation source 18, the inspector looks for uniformity, skipping, lines, and defects or damage to coating 14. The inspector can also look for holes or wear in coating 14. Ideally, dye compound 16 has a long lifespan and allows for inspection of parts with radiation source 18 after manufacturing and also after use of the parts in service. For example, parts in service that experience humidity, marine factors, acid rain, $NO_x$, $SO_x$, or other environmental conditions, can be inspected to ensure coating 14 is still intact.

Figure 2:
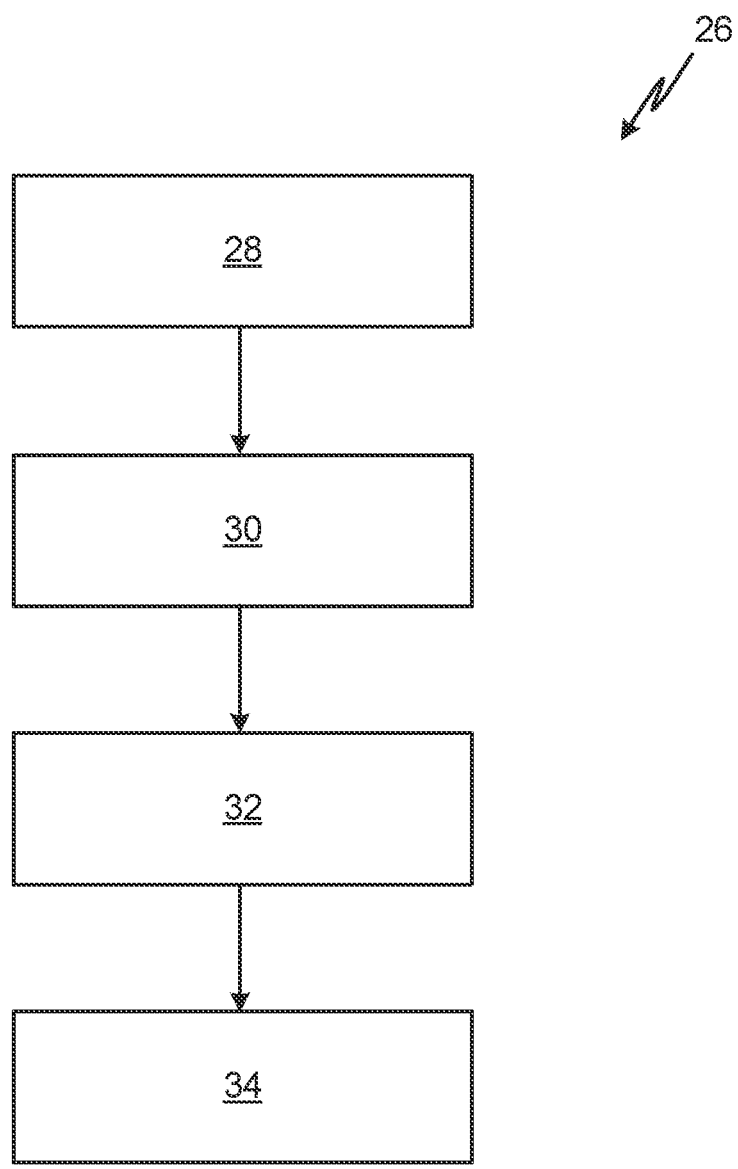
FIG. 2 is a flow chart of a method of making a conversion coating that includes a dye compound that is observable when exposed to electromagnetic radiation outside the human visual spectrum.

FIG. 2 is a flow chart of method 26 of making and inspecting a trivalent chromium or chromium-free conversion coating 14 containing a dye compound 16 with steps 28-34.

First, in step 28, the coating is prepared. A conversion coating is chosen that will work to passivate the surface of the metallic component needing corrosion protection. The coating can be a commercially available conversion coating such as those discuss with reference to FIG. 1. The coating also includes a dye compound as described with reference to FIG. 1. The dye compound can be mixed into the conversion coating through normal methods such as dispersion, mechanical mixing, or any other method that a person skilled in the art would deem to be appropriate. The coating may contain other chemicals such as surfactants or additives for the integrity of the conversion coating. Mixing methods should avoid phase separation of the coating.

Next, in step 30, the coating is applied to the component surface. Conversion coatings can be applied through methods such as submerging the substrate in a chemical bath, application with a pen or brush, or spray or wipe applications or any other method that a person skilled in the art would deem to be appropriate. In some embodiments, the substrate may need to be prepared through cleaning or other surface modifications to encourage adhesion of the coating using methods that a person skilled in the art would deem to be appropriate.

Alternatively, the conversion coating can be applied to the substrate first, and the dye compound can be added during or after application of the coating to the substrate. If the dye compound is added after application of the coating to the substrate, then the dye compound must adhere to or get absorbed within the conversion coated surface, but not be absorbed to an un-coated surface.

In step 32, the coating and component are cured. Depending on the conversion coating and dye chosen, the coating may be air dried, or alternatively cured with heat or other drying methods that a person skilled in the art would deem to be appropriate. The curing method chosen should not damage the conversion coating or its corrosion resistance performance. This may limit the temperature range at which the coating and component are cured.

Once application of the coating to the component surface is complete, the coating is inspected with a radiation source in step 34. The radiation source should correlate to the dye compound used in the coating. For instance, if a dye compound that absorbs UV wavelengths of light is used, then the radiation source should be a UV lamp. In other embodiments, a fluorescent lamp, a phosphorescent lamp, an electron beam or other radiation source can be used.

Application of the radiation source to the coating allows dye compound to become observable, and allows for inspection of the coating. The coating can be viewed for coating uniformity and thickness (through detection of "darkness" of the particular dye selected), and weak or missed spots can be seen in this inspection. If there are serious problems with the coating, it can be stripped and re-applied.

This method of inspection can be used both immediately after coating application and later after the substrate component has been in use. For example, a component can be coated with a conversion coating and dye compound when manufactured, and then put into service. When maintenance schedules require the component to be removed and inspected, the coating can also be inspected with the appropriate light source. This allows for continual monitoring of conversion coatings through the lifespan of components.

The use of a dye compound in a conversion coating allows for inspection of the presence and uniformity of the surface treatment where the coating is typically non-visible within the human visible spectrum. This allows for quality control in manufacturing and later repair of coating with defects. Moreover, the inspection of such a coating with a radiation source does not require difficult to obtain equipment and can be an efficient, portable method of inspecting coatings.

Discussion of Possible Embodiments

The following are non-exclusive descriptions of possible embodiments of the present invention.

A component includes a substrate and a conversion coating thereon. The conversion coating includes a conversion compound and a dye compound, wherein the dye compound interacts with electromagnetic radiation outside the human visual spectrum to produce an observable emission.

The component of the preceding paragraph can optionally include, additionally and/or alternatively, any one or more of the following features, configurations and/or additional components:

The substrate is selected from the group consisting of aluminum, magnesium, zinc, nickel, titanium, silver, steel, tin, and alloys thereof.

The dye compound contains molecules observable in the visible in the visible, infrared, or ultra violet range of the electromagnetic spectrum.

The dye compound is fluorescent.

The dye compound emits visible light when exposed to ultra-violet electromagnetic radiation.

The conversion coating has a thickness of 20-500 nm.

A conversion coating solution includes a corrosion inhibiting component and a dye compound that interacts with electromagnetic radiation but not electromagnetic radiation that is within the human visual spectrum to produce an observable emission.

The coating of the preceding paragraph can optionally include, additionally and/or alternatively, any one or more of the following features, configurations and/or additional components:

The corrosion inhibiting component is selected from the group consisting of, complex chromium (III), chromium sulfate, chromium hydroxide sulfate, chromium trifluoride solutions, dipotassium hexafluorozirconate, zinc sulfate heptahydrate, sodium sulphate, potassium tetrafloroborate, lanthanum nitrate hexahydrate, and combinations thereof.

The non-visible dye component comprises fluorescent molecules selected from the group consisting of polycyclic hydrocarbons, polyaromatic hydrocarbons, and combinations thereof.

The polyaromatic hydrocarbons contain sulfur, nitrogen, or oxygen.

The polycyclic or polyaromatic hydrocarbons are selected from the group consisting of anthra-thioxanthene, thioxanthene benzanthrone, anthraquinones, xanthene, benzothioxanthene-dicarboximide, aminoketones, coumarin, hydroxycoumarin, naphthalimide and perylene.

The non-visible dye component comprises phosphorescent molecules selected from the group consisting of strontium aluminates, lanthanide doped strontium aluminates, manganese doped strontium aluminates, and copper activate zinc sulfide.

The non-visible dye comprises less than 15% by weight of the conversion coating solution.

The non-visible dye comprises less than 10% by weight of the conversion coating solution.

The non-visible dye comprises less than 5% by weight of the conversion coating solution.

A method of inspecting a conversion coating includes applying electromagnetic radiation to a conversion coating comprising a non-hexavalent chromium corrosion inhibiting compound and a dye compound that interacts with electromagnetic radiation to produce an observable emission, and inspecting the integrity of the conversion coating with by observing emissions from the dye compound in response to the electromagnetic radiation.

The method of the preceding paragraph can optionally include, additionally and/or alternatively, any one or more of the following features, configurations and/or additional components:

The method includes applying the conversion coating to a substrate and curing the conversion coating on the substrate.

Applying electromagnetic radiation comprises inducing phosphoresce in the dye compound.

Applying electromagnetic radiation comprises inducing fluorescence in the dye compound.

Applying electromagnetic radiation comprises exposing the dye compound to ultra violet light to induce black light emission from the dye compound.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A component comprising:
   a substrate; and
   a conversion coating thereon, wherein the conversion coating is colorless to human perception and comprises:
      a corrosion inhibiting compound; and
      a dye compound, wherein the dye compound interacts with electromagnetic radiation outside the human visual spectrum to produce an observable emission, the dye compound comprises phosphorescent molecules selected from the group consisting of strontium aluminates, lanthanide doped strontium aluminates, manganese doped strontium aluminates, and copper activate zinc sulfide;
   wherein the electromagnetic radiation outside the human visual spectrum has a wavelength less than 390 nm or greater than 700 nm.

2. The component of claim 1, wherein the substrate is selected from the group consisting of aluminum, magnesium, zinc, nickel, titanium, silver, steel, tin, and alloys thereof.

3. The component of claim 1, wherein the dye compound contains molecules observable in the visible, infrared, or ultra violet range of the electromagnetic spectrum.

4. The component of claim 1, wherein the dye compound emits visible light when exposed to ultra-violet electromagnetic radiation.

5. The component of claim 1, wherein the conversion coating has a thickness of 20-500 nm.

6. A method of inspecting a conversion coating comprising:
   applying electromagnetic radiation to a conversion coating comprising a non-hexavalent chromium corrosion inhibiting compound and a dye compound that interacts with electromagnetic radiation to produce an observable emission, wherein the dye compound comprises phosphorescent molecules selected from the group consisting of strontium aluminates, lanthanide doped strontium aluminates, manganese doped strontium aluminates, and copper activate zinc sulfide, wherein the conversion coating is colorless to human perception and the electromagnetic radiation has a wavelength less than 390 nm or greater than 700 nm; and
   inspecting the integrity of the conversion coating with by observing emissions from the dye compound in response to the electromagnetic radiation.

7. The method of claim 6, further comprising applying the conversion coating to a substrate and curing the conversion coating on the substrate.

8. The method of claim 6, wherein applying electromagnetic radiation comprises inducing phosphoresce in the dye compound.

9. The method of claim 6, wherein applying electromagnetic radiation comprises exposing the dye compound to ultra violet light to induce black light emission from the dye compound.

10. The component of claim 1, wherein the observable emission is outside the human visible spectrum.

11. The component of claim 1, wherein the dye compound does not alter the human perception that the conversion coating is colorless.

12. The method of claim 6, wherein the emissions are outside the human visible spectrum and are observed with a UV or IR detector.

13. The method of claim 6, wherein the dye compound does not alter the human perception that the conversion coating is colorless.

* * * * *